No. 854,934. PATENTED MAY 28, 1907.
E. DIETRICH.
SPLIT PULLEY.
APPLICATION FILED APR. 26, 1905.

Witnesses:
C. H. Crawford
E. Heymann

Inventor:
Emil Dietrich
by B. Singer
Attorney

UNITED STATES PATENT OFFICE.

EMIL DIETRICH, OF BURGSTÄDT, NEAR CHEMNITZ, GERMANY.

SPLIT PULLEY.

No. 854,934.  Specification of Letters Patent.  Patented May 28, 1907.

Application filed April 26, 1905. Serial No. 257,456.

*To all whom it may concern:*

Be it known that I, EMIL DIETRICH, a subject of the German Emperor, residing at Burgstädt, near Chemnitz, in the Kingdom of Saxony and Empire of Germany, have invented certain new and useful Improvements in Split Pulleys, of which the following is a specification.

This invention relates to a split pulley constructed of sheet-metal. The arms of said pulley, for the purpose of reducing its weight, are provided with strengthening ribs formed by pressing or swaging, and its rim is provided with lateral flanges to which strengthening rings are fixed. The segments forming the rim and the strips or plates forming the arms are assembled by means of rivets or the like, the ends of the said segments and strips or plates being bent over for that purpose. This arrangement allows of constructing, at low cost, a pulley of great lightness and strength, adapted to offer very effective resistance to the strain exerted thereon by the belt passing over its rim.

In the annexed drawing the improved pulley is illustrated and is made in two parts, that is to say, in two halves which can be taken apart in order to allow of adjusting and fixing the pulley to any desired part of the shaft in the connection with which it is to be used. The pulley can, however, also be built up of three or more parts, while retaining the characteristic features already indicated, but it is only in the case of exceptionally large pulleys that more than two parts need be used.

Figure 1:
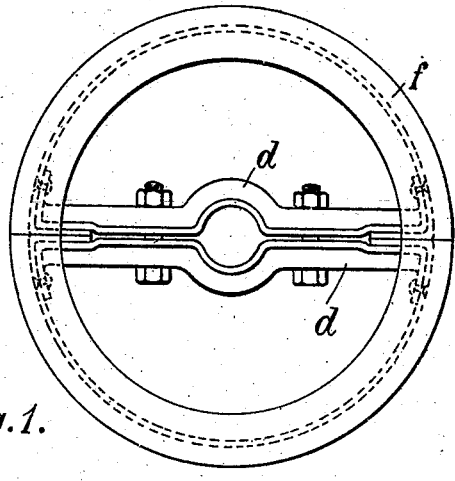
Figure 2:
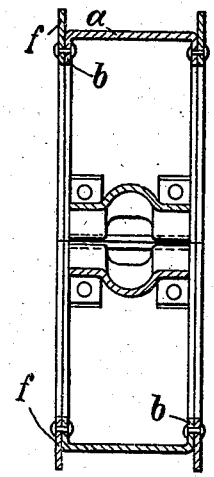
Figure 3:
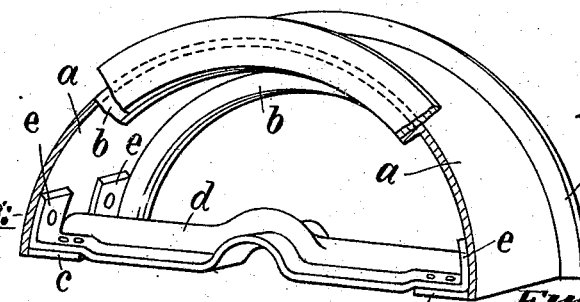

In the drawing Figure 1 is a side-view, Fig. 2 a cross-section, and Fig. 3 a perspective view partly in section illustrating one form of the pulley.

As shown the pulley-rims $a$ are provided with internal lateral flanges $b$, and the ends of the segments forming the said rims are bent inward at $c$ in order to afford means for firmly connecting the arms to the said segments. Each of the plates of which the arms are formed is provided with a central longitudinal rib $d$, which may be produced by means of a swage, the distance between the ends of this rib being equal to the internal diameter of the pulley. The projecting lugs $e$ at the ends of the arm are bent outward and fixed to the rim-segments $a$ by means of rivets. The double connection formed by riveting the said lugs $e$ and the ends $c$ of the segments is very simple and cheap to produce, and affords great strength. The ends of the arms are bent in such a manner as to engage over the bent ends $c$ of the rim-segments, and the ends of the ribs $d$ are situated between the respective lugs $e$. To the outer surfaces of the flanges $b$ rings $f$ are riveted, principally for the purpose of strengthening the rim. In the form of construction shown in Figs. 1 to 3 the said rings are of simple rectangular cross-section and project beyond the outer circumference of the pulley, so that besides strengthening the latter they prevent the sliding off of the belt.

It is obvious that the arrangement described affords great advantages in the manufacture of pulleys from sheet metal.

Having now fully described my invention I declare that what I claim is:

In a split sheet metal pulley, the combination of a plurality of rim segments respectively provided with inwardly bent ends and internal lateral flanges, arms provided with strengthening ribs and outwardly bent ends, said bent ends being fixed to said rim segments, and strengthening rings attached to said lateral flanges and extending outwardly beyond the circumference of the pulley rim.

In testimony whereof I affix my signature in presence of two witnesses.

EMIL DIETRICH.

Witnesses:
 MORRIS LIPMAN,
 FREDERICK J. DIETZMAN.